(12) United States Patent
Tu et al.

(10) Patent No.: US 7,194,671 B2
(45) Date of Patent: Mar. 20, 2007

(54) MECHANISM HANDLING RACE CONDITIONS IN FRC-ENABLED PROCESSORS

(75) Inventors: Steven J. Tu, Phoenix, AZ (US); Alexander J. Honcharik, Chandler, AZ (US); Hang T. Nguyen, Tempe, AZ (US); Sujat Jamil, Chandler, AZ (US); Quinn W. Merrell, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 549 days.

(21) Appl. No.: 10/039,587

(22) Filed: Dec. 31, 2001

(65) Prior Publication Data

US 2003/0126142 A1     Jul. 3, 2003

(51) Int. Cl.
 G01R 31/28 (2006.01)
 G06F 11/00 (2006.01)
(52) U.S. Cl. .................... 714/744; 714/733
(58) Field of Classification Search ............. 327/144; 712/220; 714/10, 819, 820, 734, 744, 736, 714/733; 700/82
 See application file for complete search history.

(56) References Cited

U.S. PATENT DOCUMENTS

| | | | | |
|---|---|---|---|---|
| 3,701,972 | A * | 10/1972 | Berkeley et al. ............. 710/36 | |
| 4,012,717 | A | 3/1977 | Censier et al. | |
| 4,325,120 | A | 4/1982 | Colley et al. | |
| 5,155,856 | A | 10/1992 | Bock et al. | |
| 5,163,155 | A | 11/1992 | Omiya | |
| 5,260,950 | A | 11/1993 | Simpson et al. | |
| 5,758,058 | A * | 5/1998 | Milburn ...................... 714/11 | |
| 5,862,373 | A * | 1/1999 | Pathikonda et al. ........ 713/501 | |
| 5,915,082 | A | 6/1999 | Marshall et al. | |
| 5,935,266 | A | 8/1999 | Thurnhofer et al. | |
| 6,061,599 | A * | 5/2000 | Rhodehamel et al. .......... 700/2 |
| 6,114,887 | A * | 9/2000 | Pathikonda et al. ........ 327/154 |
| 6,125,463 | A | 9/2000 | Macchi | |
| 6,173,351 | B1 | 1/2001 | Garnett et al. | |
| 6,357,024 | B1 * | 3/2002 | Dutton et al. ................. 714/45 |
| 6,393,582 | B1 | 5/2002 | Klecka et al. | |
| 6,615,366 | B1 * | 9/2003 | Grochowski et al. ......... 714/10 |
| 6,625,749 | B1 * | 9/2003 | Quach ......................... 714/10 |
| 6,625,756 | B1 * | 9/2003 | Grochowski et al. ......... 714/17 |
| 6,640,313 | B1 * | 10/2003 | Quach ......................... 714/10 |
| 6,708,304 | B1 | 3/2004 | Tsukimori et al. | |

FOREIGN PATENT DOCUMENTS

| WO | WO 01/46806 | 6/2001 |
|---|---|---|
| WO | PCT/US03/36345 | 5/2005 |

OTHER PUBLICATIONS

Sun Microelectronics, MicroSPARC-IIep, Introduction to JTAG Boundary Scan, White Paper Jan. 1997 (10 pgs).
Joel M. Tendler, Steve Dodson, Steve Fields, Hung Le, Balaram Sinharoy, IBM Server Group, IBM eserver, POWER4 System Microarchitecture, Technical White Paper, Oct. 2001, pp. 1-33.
David J.C. Johnson, Fort Collins Microprocessor Lab, HP's Mako Processor, Oct. 16, 2001, 16 pgs.

* cited by examiner

*Primary Examiner*—Albert Decady
*Assistant Examiner*—Mujtaba K. Chaudry
(74) *Attorney, Agent, or Firm*—Blakely, Sokoloff, Taylor & Zafman LLP (57) ABSTRACT

An processor includes first and second execution cores that operate in an FRC mode, an FRC check unit to compare results from the first and second execution cores, and an error check unit to detect recoverable errors in the first and second cores. The FRC check unit temporarily stores results from the first or second core, and a timer is activated if a mismatch is detected. If the error detector detects a recoverable error before the timer interval expires, a recovery routine is activated. If the timer interval expires first, a reset routine is activated.

20 Claims, 8 Drawing Sheets

PRIOR ART

MECHANISM HANDLING RACE CONDITIONS IN FRC-ENABLED PROCESSORS

BACKGROUND OF THE INVENTION

1. Technical Field

The present invention relates to microprocessors and, in particular, to mechanisms for handling errors in FRC-enabled processors.

2. Background Art

Servers and other high-end computer system are designed to provide high levels of reliability and availability. Soft errors pose a major challenge to both of these properties. Soft errors result from bit-flipping collisions between high-energy particles, e.g. alpha particles, and charge storing nodes. They are prevalent in storage arrays, such as caches, TLBs, and the like, which include large numbers of charge storing nodes. Rates of occurrence of soft errors (soft error rates or SERs) will only increase as device geometry decreases and device densities increase.

Highly reliable systems include safeguards to detect and manage soft errors, before they lead to silent, e.g. undetected, data corruption (SDC). However, to the extent error detection/handling mechanisms take a system away from its normal operations, the system's availability is reduced.

One well-known mechanism for detecting soft errors is functional redundancy checking (FRC). An FRC-enabled processor includes replicated instruction execution cores on which the same instruction code is run. Depending on the particular embodiment, each replicated execution core may include one or more caches, register files and supporting resources in addition to the basic execution units (integer, floating point, load store, etc.). FRC-hardware compares results generated by each core, and if a discrepancy is detected, the FRC system jumps to an error-handling routine. Since FRC errors indicate only that the execution cores disagree on a result, the error handling routine typically unwinds execution to the last know point of reliable data and resets the processor. This reset mechanism is relatively time consuming.

The point(s) at which results from different execution cores are compared represent the FRC-boundary for the system. Errors that are not detected at the FRC boundary can lead to SDC, but even managing detected FRC errors can create its own problems. As noted above, time spent by the system handling FRC-errors takes the system away from its normal operation, reducing system availability.

FRC is only one mechanism for handling soft errors, and for random logic, it is the primary mechanism. Array structures present a different picture. Array structures typically include parity and/or ECC hardware to detect soft errors. ECC hardware can even correct single bit errors on the fly. Further, unlike FRC errors, which only indicate that one of the execution cores generated an error, parity/ECC errors are clearly tied to one of the execution cores by the logic that detects them.

If a parity/ECC error in an execution core is detected before the corrupted data reaches the FRC boundary, the execution core that has the good, i.e. uncorrupted, data can be identified and used to recover from the error. If the corrupted data reaches the FRC boundary before the underlying parity/ECC error is detected, an FRC error will be generated, and the system will be unavailable while the FRC error is addressed. There is thus a race between the logic that processes the corrupted data towards the FRC boundary and the logic that detects its corrupted state. This race can have a significant impact on system availability, due to the longer latency of the reset mechanism triggered by an FRC-error (data mismatch) relative to the recovery mechanism triggered by an underlying parity/ECC error.

The present invention address these and other problems associated with error handling in FRC-enabled processors.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

Figure 1:
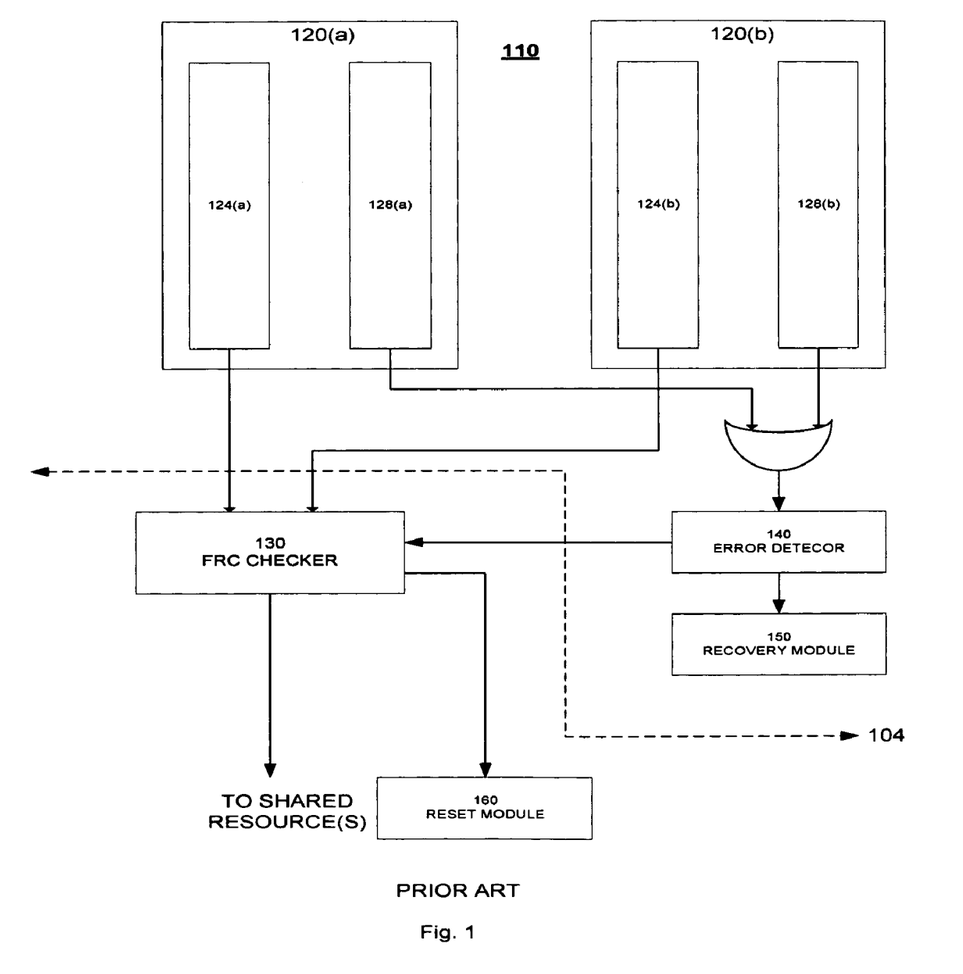
FIG. 1 is a block diagram of an FRC-enabled processor that includes dual execution cores and FRC-detection and handling logic.

FIG. 1 is a block diagram representing an FRC-enabled processor 110. Processor 110 includes first and second execution cores 120(a), 120(b) (generically, execution core 120), an FRC checker 130, an error detector 140, a recovery unit 150, and reset unit 160. A portion of the FRC-boundary is indicated by dashed line 104. For purposes of illustration, recovery unit 150 and reset unit 160 are shown as part of processor 110, but portions of these units may be implemented as firmware or software modules that are located off of the processor die.

Each execution core 120 includes a data pipeline 124 and an error pipeline 128 that feed into FRC checker 130 and error detector 140, respectively. Data pipeline 124 represents the logic that operates on various types of data as it moves through processor 110 toward FRC checker 130. The data represented by data pipeline 124 may include result operands, status flags, addresses, instructions and the like that are generated and staged through processor 110 during code execution. Error pipeline 128 represents the logic that operates on various types of data to detect errors in the data and provide appropriate error signals to error detector 140. For example, the error signals may be one or more bits (flags)

representing the parity or ECC status of data retrieved from various storage arrays (not shown) of processor 110. Soft errors in these arrays may appear as parity or ECC error flags when the corrupted data is accessed.

If an error reaches error detector 140 from either core 120, recovery unit 160 is activated to implement a recovery routine. Recovery can be effected with relatively low latency by hardware, software, firmware or some combination of these. For example, there is an extremely small probability that the same data is corrupted in both execution cores 120, which leaves an uncorrupted copy of the data available to restore data integrity to processor 110. However, an FRC error will be triggered if the corrupted and uncorrupted data is allowed to reach FRC checker 130 before recovery unit 160 is activated. Since FRC errors are not recoverable, reset module 170 will unwind the machine state of processor 110 and reset it, if FRC checker 130 signals an FRC error before the underlying parity/ECC error is detected.

Not all FRC-errors are traceable to underlying parity/ECC or other correctible soft errors. For those that are, it is faster for error detector 140 to address the underlying soft error than for FRC-checker to address the FRC error that results when the corrupted data reaches FRC boundary 104. As noted above, the reset process has a significantly longer latency than the recovery process, and it is to be avoided if the error can be corrected by recovery unit 150. For this reason, FRC checker 130 is temporarily disabled if error detector 140 detects an error in either error pipeline 128.

Data pipelines 120 operate in lock step during normal FRC mode, but data pipeline 124 and error pipeline 128 may operate relatively independently. For example, ECC hardware is relatively complex and consequently, relatively slow, especially for 2-bit errors. A flag signaling such an error may reach error detector 140 before, after, at the same time as the data with which it is associated reaches FRC checker 130. This flexibility is generally beneficial. For example, it allows data to be used speculatively before its error status is determined. Since soft errors are relatively rare, and error pipeline 124 is generally as fast as data pipeline 128, this flexibility is net positive. As long as the error flag arrives at error detector 140 in time to disable FRC checker 130 before it receives the corrupted data, the relatively low latency recover routine is engaged.

As noted above, races between data pipeline 124 and error pipeline 128 can reduce system availability in certain cases if not addressed. If an error flag indicating a soft error reaches detector 140 too late to disable FRC checker 130 from processing the associated data, a recoverable error becomes an FRC error, and the longer latency reset routine is engaged. The longer latency reset routine reduces the availability of system 100 for normal operation.

Figure 2:
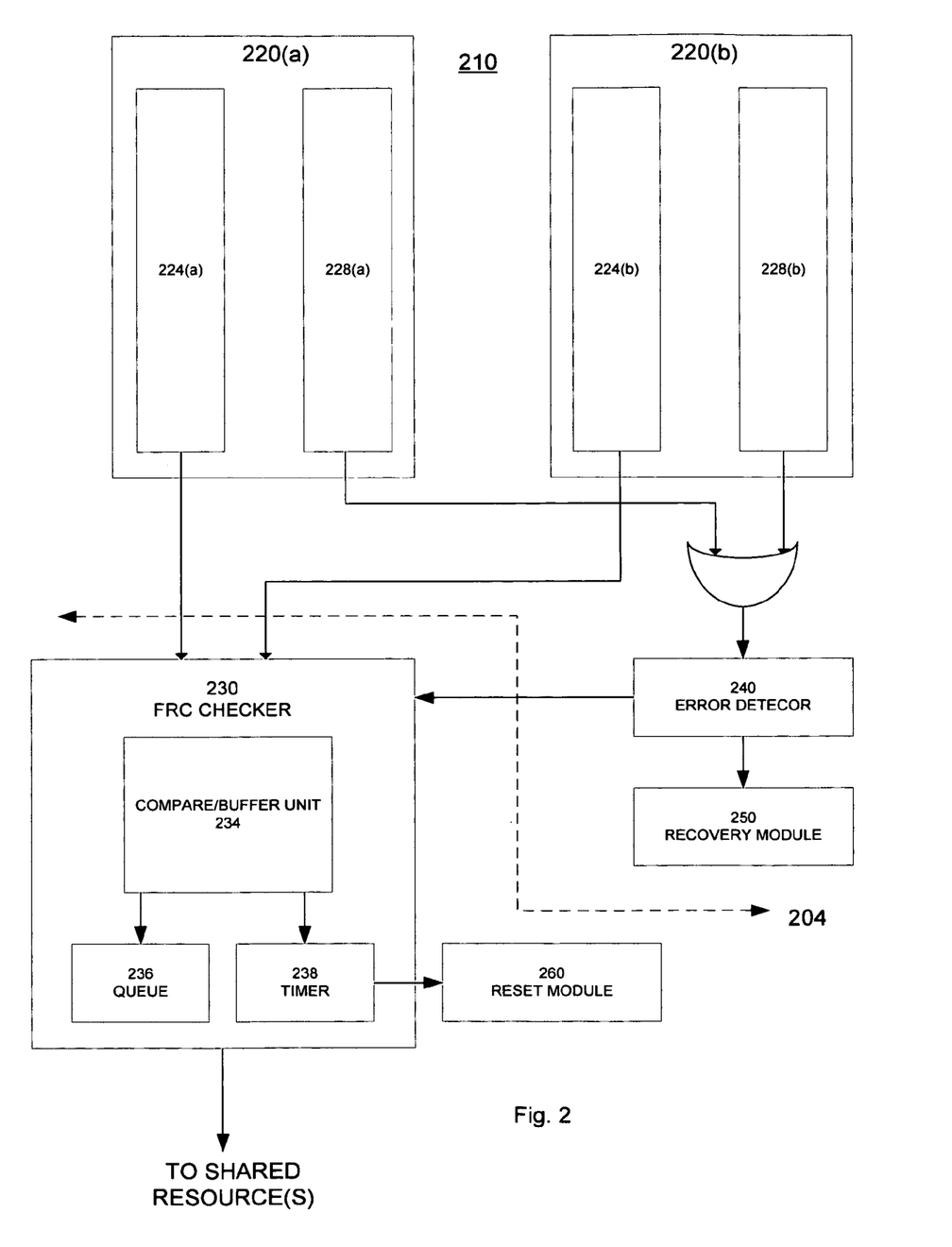
FIG. 2 is a block diagram of one embodiment of an FRC-enabled processor that implements an error-detection and handling system in accordance with the present invention.

FIG. 2 is a block diagram of one embodiment of an FRC-enabled processor 210 that handles race conditions effectively. Processor 210 includes first and second execution cores 220(a), 220(b) (generically, execution core 220), an FRC checker 230, an error detector 240, a recovery unit 250, and reset unit 260. An FRC-boundary for processor 210 is indicated by dashed line 204. As noted above, portions of recovery unit 250 and reset unit 260 may be implemented as firmware or software modules that are located off of the processor die.

Each execution core 220 includes a data pipeline 224 and an error pipeline 228 that feeds into FRC checker 230 and error detector 240, respectively. Execution cores 220(a), 220(b) and their components operate in substantially the same manner as described above for execution cores 120(a), 120(b).

Error detector 240 monitors error pipelines 228(a), 228(b). If a signal or flag indicates an error in one of execution cores 220, error detector 240 disables FRC checker 230 and activates recovery unit 250. As discussed below in greater detail, FRC checker 230 provides buffering that allows error detector 240 to activate recovery unit 250, even if it detects the error after FRC checker 230 detects a mismatch between the corresponding corrupted and uncorrupted data. Provided the error is detected within a countdown interval initiated by an FRC mismatch, the FRC mismatch is ascribed to the error, and processor 210 activates a recovery routine through recovery unit 250 rather than a slower reset routine through reset unit 260.

Towards this end, the disclosed embodiment of FRC checker 230 includes a compare/buffer unit 234, a queue 236 and a timer unit 238. Compare/buffer unit 234 receives data from execution cores 220(a), 220(b), compares the data, and temporarily stores data from at least one execution core 220 along with a status flag to indicate if the comparison yielded a match. If the data matches, the status flag is set to indicate the match, and the data is buffered to queue 236 for continued processing by resources outside FRC boundary 204. As discussed below, hold times for data in compare/buffer unit 234 depend on the number of entries it provides, which may depend on the countdown interval selected.

If the data does not match, the status flag is set to indicate the mismatch and timer unit 238 is triggered to begin a countdown interval. Compare/buffer unit 234 may continue to receive, compare and store data from execution cores 220(a), 220(b) during the countdown interval. Similarly, error detector 240 may continue to monitor error pipelines 228(a), 228(b). If error detector 240 receives an error flag before the timeout interval expires, it disables FRC checker 230 from receiving additional data from execution cores 220(a), 220(b) and triggers recovery unit 250 to implement the recovery routine for the entry tagged as a mismatch in compare/buffer unit 234.

Operation of FRC checker 230 and execution cores 220 during the countdown interval that follows an FRC mismatch may vary with different embodiments of the invention. For example, the stall behavior of execution cores 230 and the source of uncorrupted data may differ depending on whether results from one or both execution cores 220 are stored by compare/buffer 234.

Figure 3A:
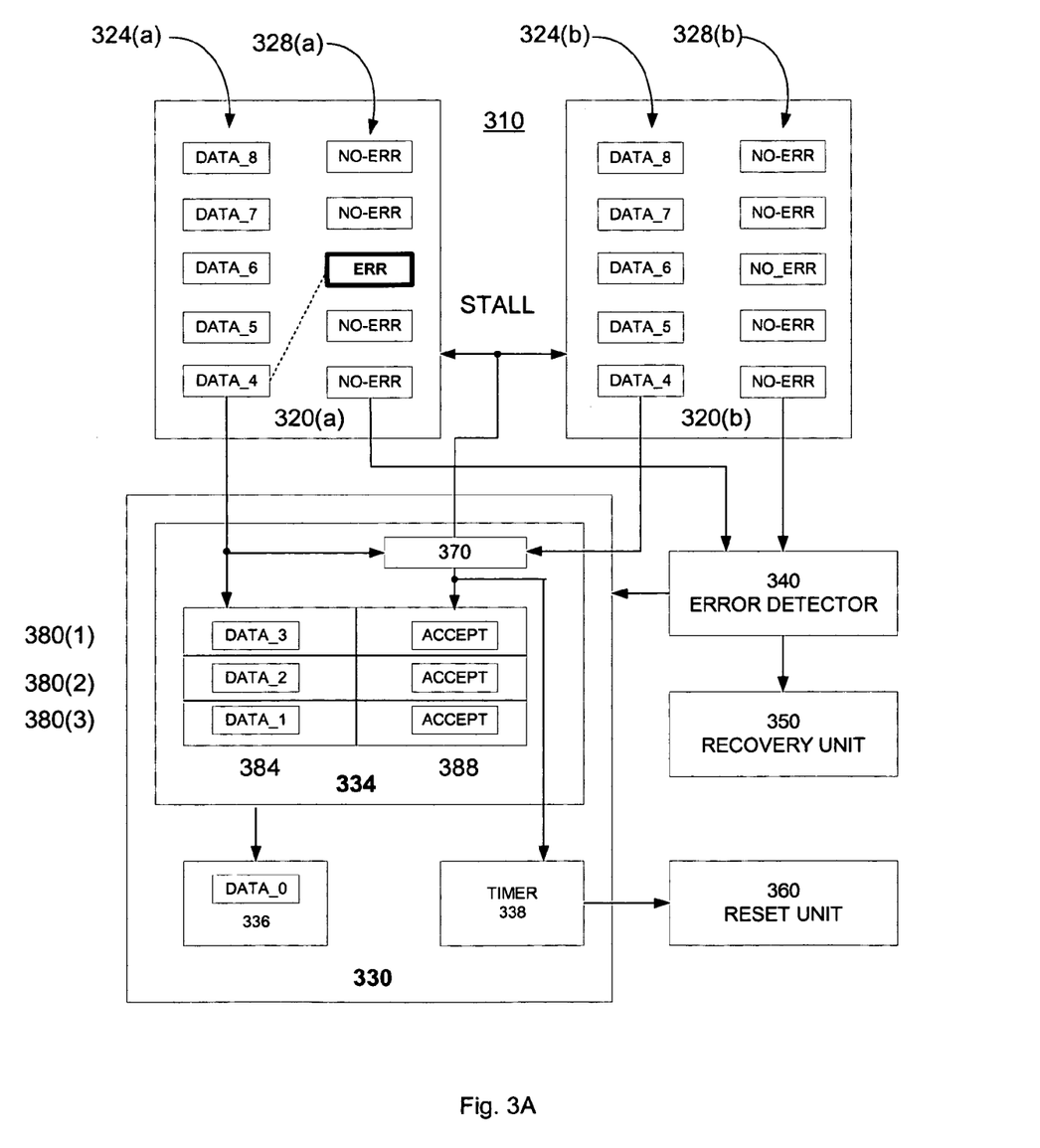
FIGS. 3A and 3B are block diagrams representing the states of one embodiment of the FRC-checker of FIG. 2 at two different times.
Figure 3B:
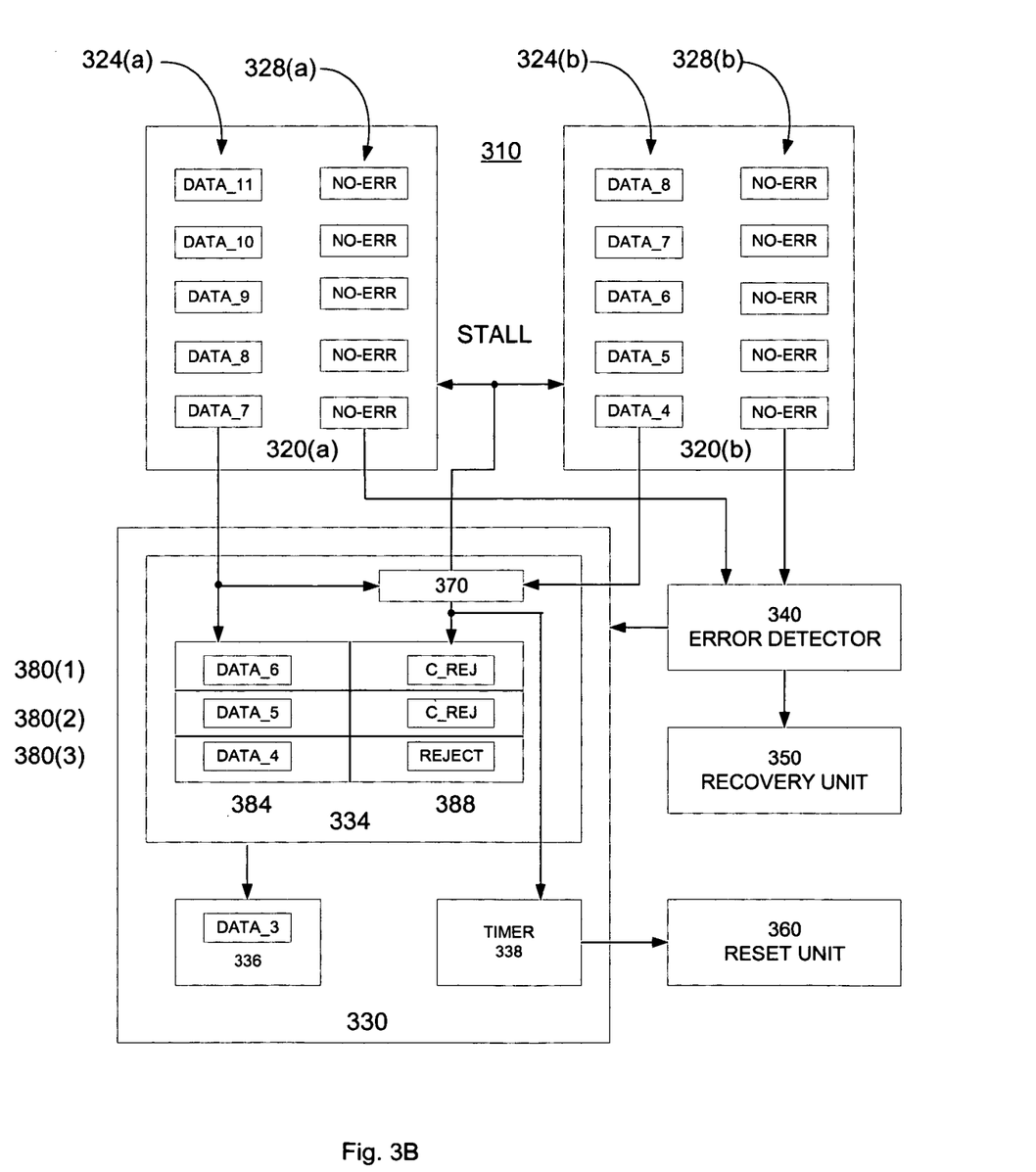

FIGS. 3A and 3B are block diagrams of one embodiment of a processor 310 in accordance with the present invention at two different times. Contents of data pipeline 324 and error pipeline 328 are labeled to indicate the relative times at which they are processed through execution core 320. The labeled data blocks are not necessarily valid or fully developed until they exit pipeline 324. For purposes of the following discussion, execution core 320(a) operates as the master and execution core 320(b) operates as the slave, when processor 310 is in FRC mode.

The disclosed embodiment of compare/buffer 334 includes a buffer, a comparator 370 and buffer entries 380(1)–380(3) (generically, buffer entries 380). Comparator 370 compares data from execution cores 320(a) and 320(b) and generates a match status signal according to the comparison. Comparator 370 also triggers a stall signal to one of execution cores 320 if the status signal indicates a mismatch. Each buffer entry 380 includes a data field 384 to store the data from master execution core 320(a) and a status field 388 to store the status determined by comparator 370.

For the instant reflected in FIG. 3A, data_0 has been accepted and forwarded to queue 336 for further processing. Here, "accepted" means that the data_0 blocks provided by master and slave execution cores 320(a), 320(b), respectively, matched, and no FRC error is indicated by comparator 370. Data_1 through data_3 are accepted and currently stored in buffer entries 380(1)–380(3), awaiting transfer to queue 336. Data_4 through data_8 are currently propagating through data pipelines 324(a), 324(b) of master and slave execution cores, 320(a), 320(b), respectively. An error associated with data_4 in data pipeline 324(a) (indicated by dashed line) is propagating through error pipeline 328(a) approximately two clock cycles behind data_4. For example, the error may represent a 2-bit soft error detected by ECC hardware. The detection hardware for 2-bit ECC errors is relatively complex, and may contribute to the delay indicated between data_4 and its error flag.

FIG. 3B shows processor 310 at a later instant in which data_3 from execution core 320(a) has been forwarded to queue 336, data_4–data_6 have been transferred to buffer 380 and their match status determined. In particular, comparator 370 has signaled a mismatch (reject) for data_4, which was corrupted by a soft error, and its uncorrupted counterpart from execution core 320(b). Comparator 370 has also triggered the stall signal to slave execution core 320(b) and triggered timer unit 338 to begin the countdown interval. For the disclosed embodiment, stalling one of data pipelines 324 ensures that an uncorrupted copy of the data is preserved for recovery unit 350, in either the stalled pipeline or compare/buffer unit 334.

During the countdown interval, the disclosed embodiment of FRC checker 330 continues to receive data from master execution core 320(a). For the illustrated example, data_5 and data_6 have been by stored during this interval with rejected status, since corresponding elements from stalled slave execution core 320(b) are unavailable for comparison.

During the countdown interval, error detector 340 also continues to track flags from error pipelines 328. If the error flag associated with data_4 reaches error detector 340 before timer unit 338 signals the end of the countdown interval, error detector 340 disables FRC checker 330 and activates recovery unit 350. If timer unit 338 detects the end of the countdown interval before error detector 340 detects the error flag, reset unit 360 is activated.

Figure 4A:
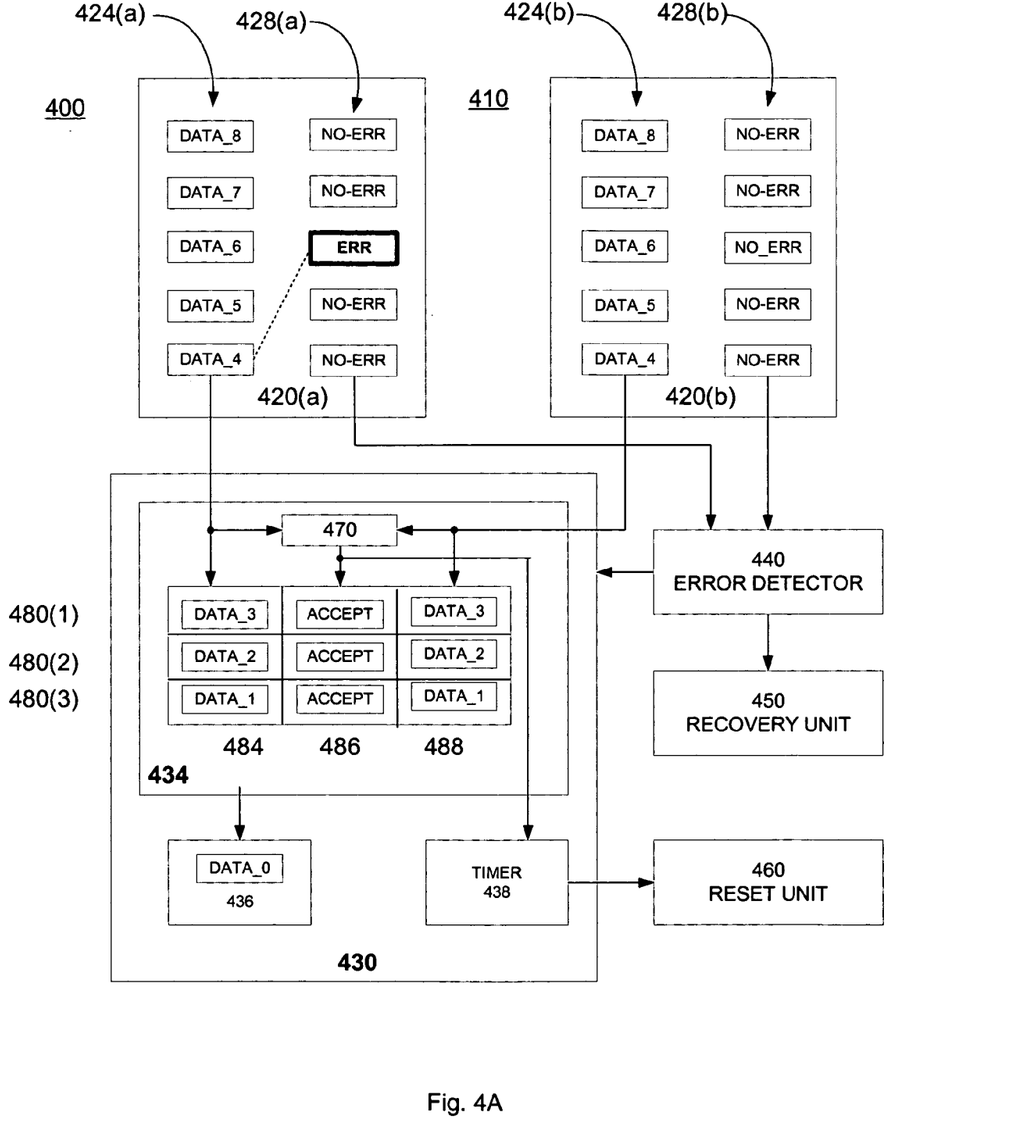
FIGS. 4A and 4B are block diagrams representing the states of another embodiment of FRC-checker of FIG. 2 at two different times.
Figure 4B:
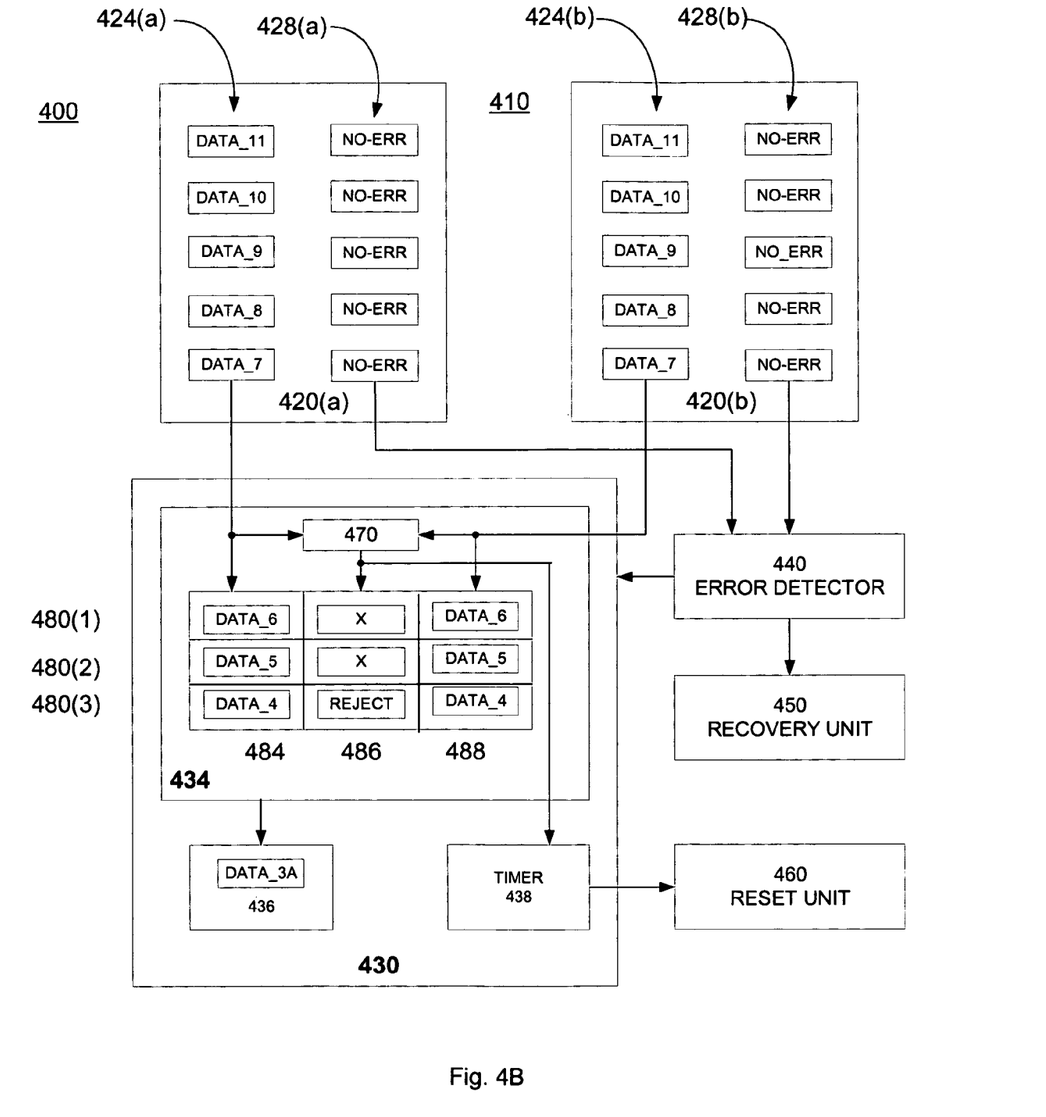

FIGS. 4A and 4B are block diagrams of another embodiment of a processor 410 in accordance with the present invention at two different times. Contents of data pipeline 424 and error pipeline 428 are labeled to indicate the relative times at which they are processed through execution core 420. For processor 410, the disclosed embodiment of compare/buffer 434 includes a comparator 470 and buffer entries 480(1)–480(3) (generically, buffer entries 480). Comparator 470 compares data from execution cores 420(a) and 420(b) and generates a match status signal according to the comparison. Each buffer entry 480 includes data fields 484 and 488 to store data from execution cores 420(a) and 420(b), respectively, and a status field 486 to store the status determined by comparator 470.

For system 400, data blocks from both pipelines 424(a). 424(b) are transferred to FRC checker 430. Consequently, no stall signal is needed to preserve uncorrupted data in one of execution cores 420 following detection of an FRC mismatch by comparator 470. The uncorrupted data may be provided from the appropriate entry of buffer 480.

Timer unit 438 initiates a countdown interval in response an FRC mismatch detected by comparator 470. FRC checker 430 and error detector 440 continue to process data and flags, respectively, during the countdown interval. If an error reaches error detector 440 before the countdown interval expires, error detector 440 disables FRC checker 430 and activates recovery unit 450. If the countdown interval expires first, FRC checker 430 activates reset unit 460 to reset system 400.

Figure 5:
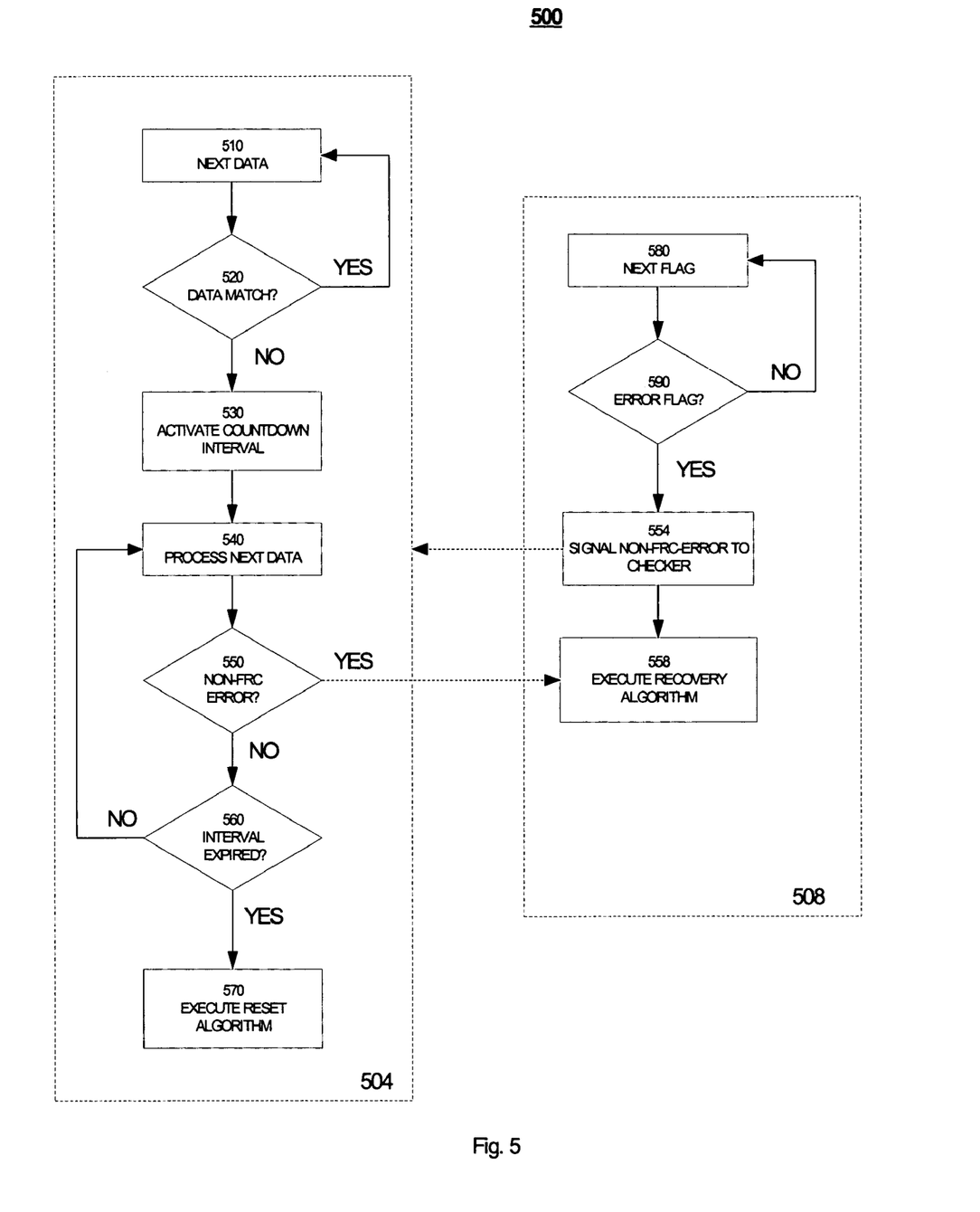
FIG. 5 is a flowchart representing one embodiment of a method 500 for handling race conditions in FRC-enabled systems in accordance with the present invention.

FIG. 5 is a flowchart representing one embodiment of a method 500 in accordance with the present invention for handling race conditions. Method 500 reflects the interactions between concurrent non-recoverable (FRC) error checking 504 and recoverable (non-FRC) error checking 508 processes.

Recoverable error checking process 508 monitors 580 flags/signals from an FRC-enabled processor. The monitored flags may be generated by parity checking hardware, ECC hardware or other units capable of detecting recoverable errors attributable to, e.g. soft errors within the FRC boundary of the processor. The flags may be provided to an error checker through pathways having various latencies. If an error flag is detected 590, a signal is asserted 554 to the FRC checker and a recovery algorithm is activated 558. The signal asserted to the FRC checker prevents it from triggering a non-recoverable error.

Non-recoverable error checking process 504 operates concurrently with recoverable error checking process 508. Data from the redundant cores of an FRC-enabled processor is tracked 510 and compared 520. If the data matches 520, no FRC-error is indicated and process 504 continues monitoring. If a mismatch is detected 520, a potential FRC-error is indicated.

To determine whether the potential FRC-error is an artifact of a race condition, a countdown interval is activated 530 and data tracking continues 540. If a recoverable (e.g. non-FRC) error is detected 550 during the countdown interval, process 504 relinquishes control to the recovery algorithm (558). If the countdown interval expires 560 before a non-FRC error is signaled, a reset algorithm is executed 570. If the countdown interval has not yet expired 560, process 504 continues monitoring 540 data until the countdown interval expires (560) or a non-FRC error is indicated 550.

Figure 6:
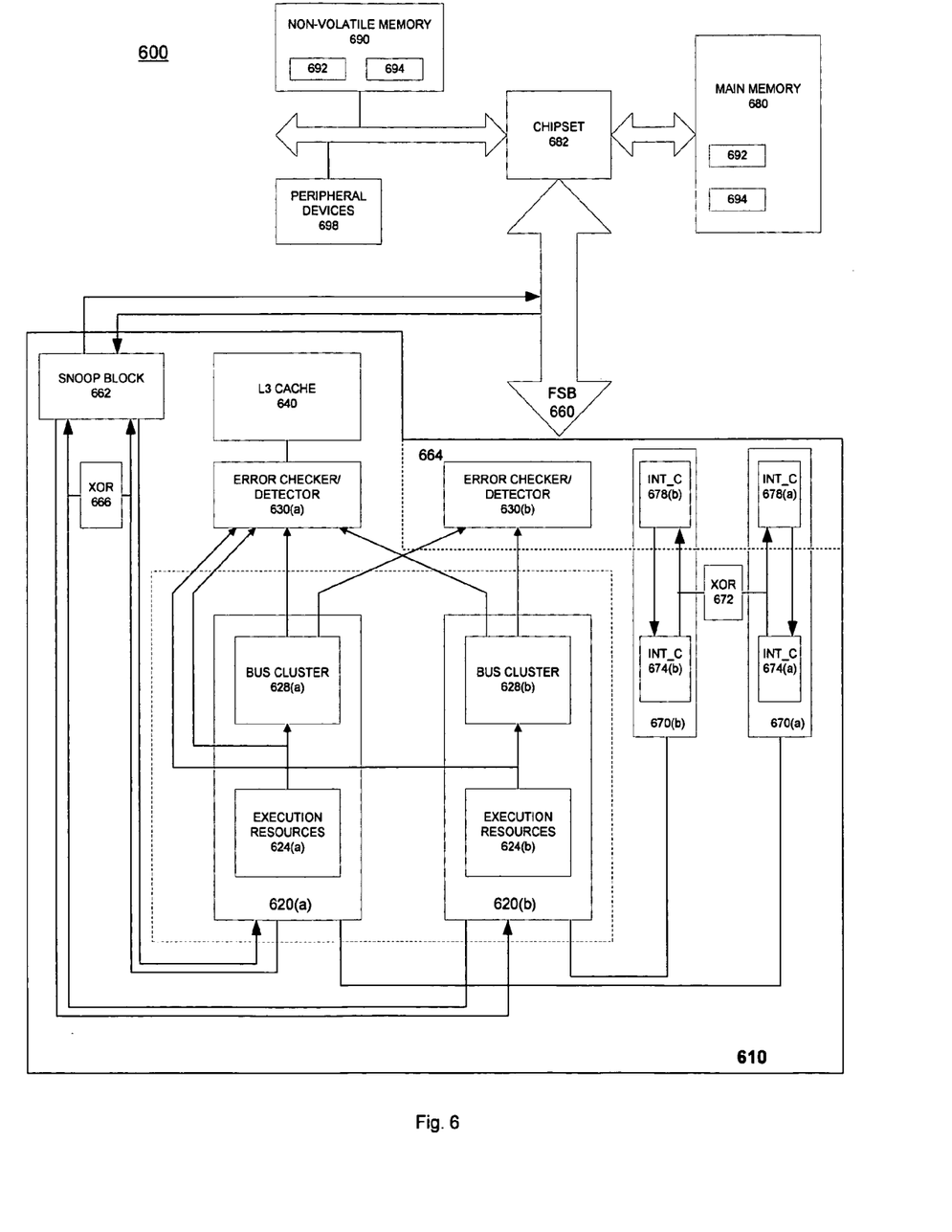
FIG. 6 is a block diagram of one embodiment of a computer system that implements an error handling system in accordance with the present invention.

FIG. 6 is a block diagram representing one embodiment of a computer system 600 in which the present invention is implemented. The disclosed embodiment of system 600 includes a processor 610, chipset 682, main memory 680, non-volatile memory 690 and peripheral device(s) 698. Chipset 682 manages communications among processor 610, main memory 680, non-volatile memory 690 and peripheral devices 698.

Processor 610 includes first and second execution cores 620(a) and 620(b), respectively (generically, execution cores 620). Each execution core includes execution resources 624 and a bus cluster 628. Execution resources 624 may include, for example, one or more integer, floating point, load/store, and branch execution units, as well register files and cache(s) to supply them with data (e.g instructions, operands, addresses). Bus cluster 628 represents logic for managing transactions to a cache 640 that is shared by execution cores 620(a) and 620(b), as well as to a front side bus 660, for those transactions that miss in shared cache 640.

Error check units 630(a), 630(b) (generically, error check units 630) compare results from execution cores 620 before they are transferred to shared resources like cache 640 and FSB 660. They thus form part of the FRC boundary of processor 610. Each error check unit 630 includes an FRC checker 230 and error detector 240 (FIG. 2) to provide FRC and non-FRC error checking/detection, respectively, for execution cores 620. Error check units 630 may also include portions of recovery unit 250 and reset unit 260 (FIG. 2). For one embodiment of system 600, a recovery routine 692 and a reset routine 694 may be stored in non-volatile memory 690 and images of these routines may be loaded in main memory 680 for execution. For this embodiment, recovery unit 250 and reset unit 260 may include pointers to recovery routine 692 and reset routine 694, respectively (or their images in main memory 680).

The disclosed embodiment of system 600 also includes interrupt controllers 670(*a*) and 670(*b*) (generically, interrupt controller(s) 670) to process interrupts for execution cores 620(*a*) and 620(*b*), respectively. Each interrupt controller 670 is shown having first and second components 674 and 678, respectively, to accommodate the different clock domains in which interrupt controller 670 may operate. For example, FSB 660 typically operates at a different frequency than processor 610. Consequently, components of processor 610 that interact directly with FSB 660 typically operate in its clock domain, which is indicated as area 664 on processor 610.

The disclosed embodiment of interrupt controller 670 also includes an FRC-boundary-like component in the form of XOR 672. XOR 672 signals an FRC error if it detects a mismatch between outgoing signals, e.g. interrupt responses, of components 674(*a*) and 674(*b*) from execution cores 620(*a*) and 620(*b*). Errors attributable to interrupt controllers 670 may still arise, however, from soft errors in components 678(*a*), 678(*b*) in FSB clock domain 664. These error may be detected by the discrepancies they introduce between the subsequent operations of execution cores 620(*a*) and 620(*b*).

For the disclosed embodiment of system 600, a common snoop block 662 processes snoop transactions to and from execution cores 620(*a*) and 620(*b*). XOR 666 provides FRC-checking on snoop responses from execution cores 620(*a*), 620(*b*) and signals an error if a mismatch is detected.

There has thus been disclosed a mechanism for handling race conditions between recoverable and non-recoverable errors in an FRC-enabled processor. An FRC checker includes a buffer to temporarily store data representing results from redundant execution cores along with status bits to indicate if the results matched. An error detector monitors error hardware to determine if any of the results may have been subject to a recoverable error, such as a parity or ECC error. If the FRC checker detects a mismatch, a potential FRC error is indicated, and a timer is activated to provide the error detector with additional time to identify a recoverable error from which the FRC error originated. If a recoverable error is detected before the countdown interval expires, a recovery mechanism is triggered. If the interval expires before a recoverable error is detected, a reset mechanism is triggered. For either recovery or reset mechanisms, the FRC-enabled processor may switch temporarily into a non-FRC mode to allow one core to execute the reset/recovery code.

The disclosed embodiments have been provided to illustrate various features of the present invention. Persons skilled in the art of processor design, having the benefit of this disclosure, will recognize variations and modifications of the disclosed embodiments, which none the less fall within the spirit and scope of the appended claims.

We claim:

1. An apparatus comprising:
   first and second execution cores to operate in an FRC mode;
   an FRC check unit to compare results from the first and second execution cores and to store at least one result and a status to indicate if the results match;
   an error check unit to assert a signal to the FRC checker if a recoverable error is detected in the first or second execution cores; and
   a timer to trigger an FRC recovery routine if the status indicates the results do not match and the error check unit asserts the signal within a specified interval.

2. The apparatus of claim 1, wherein the FRC checker stores a result from the first execution core and discards the result from the second execution core.

3. The apparatus of claim 2, wherein the FRC checker stalls the second execution core if the status indicates the results do not match and triggers a countdown to the specified interval.

4. The apparatus of claim 3, wherein the specified interval represents a time for a recoverable error to be signaled to the error detector.

5. The apparatus of claim 1, wherein the FRC check unit includes a multiple entry buffer to store results and status indicators for multiple results from the first and second execution cores.

6. The apparatus of claim 5, wherein a number of entries for the buffer is selected to determined by a largest number of clock cycle to propagate an error signal to the error detector.

7. The apparatus of claim 1, wherein the FRC check unit includes a buffer to store results from the first and second execution cores and their status.

8. The apparatus of claim 7, wherein the recovery routine reads an uncorrupted result from an appropriate entry of the buffer if the recoverable error is detected within the specified interval.

9. An system comprising:
   first and second execution cores to operate in an FRC mode;
   an FRC checker to compare results from the first and second execution cores and to trigger a countdown interval if the results do not match; and
   an error detector to monitor error signals during the countdown interval and to disable the FRC checker if a recoverable error is detected before the countdown interval expires.

10. The system of claim 9, wherein the FRC checker includes a buffer to temporarily store results from at least one of the first and second execution cores.

11. The system of claim 9, wherein the FRC checker stalls one of the first and second execution cores if the results do not match.

12. The system of claim 9, further comprising a recovery unit to recover uncorrupted results from the first or second execution core, responsive to the error detector detecting a recoverable error.

13. The system of claim 12, further comprising a reset unit to reset the system, responsive to the FRC checker indicating an FRC error.

14. The system of claim 13, wherein the FRC checker indicates an FRC error if results from the first and second execution pipelines do not match and the FRC checker is not disabled before the countdown interval expires.

15. The system of claim 13, further comprising a memory device in which a recovery routine and a reset routine are stored.

16. The system of claim 15, wherein the recovery unit and the reset unit include pointers to the recovery routine and the reset routine, respectively.

17. A method comprising:
   comparing results from a first and second execution core to detect an FRC error;

if the results do not match, setting a first flag and initiating a countdown interval;
monitoring an error signal for a recoverable error; and
initiating a recovery routine if the error signal is asserted before the countdown interval expires.

18. The method of claim 17, further comprising:
storing a result from at least one of the first and second execution cores; and
initiating a transaction to a shared resource if the first flag is not set.

19. The method of claim 18, further comprising initiating a reset routine if the error signal is not asserted before the countdown interval expires.

20. The method of claim 17, further comprising:
stalling one of the first and second execution cores if the first flag is set; and
continuing to monitor the error signal from the stalled execution core.

* * * * *